United States Patent [19]
Horvat

[11] Patent Number: 5,625,549
[45] Date of Patent: Apr. 29, 1997

[54] BOOST-BUCK RECTIFIER BRIDGE CIRCUIT TOPOLOGY WITH DIODE DECOUPLED BOOST STAGE

[75] Inventor: Ivan Horvat, Marlboro, Mass.

[73] Assignees: Kaman Electronics Corporation, Hudson, Mass.; Newport News Shipbuilding and Dry Dock Company, Newport News, Va.

[21] Appl. No.: 310,946

[22] Filed: Sep. 23, 1994

[51] Int. Cl.$^6$ .................................................. H02M 7/525
[52] U.S. Cl. ............................................................. 363/132
[58] Field of Search ........................ 363/98, 132, 39–41, 363/95, 131, 56, 97; 315/307, 291, 314, DIG. 4, 209 R

[56] References Cited

U.S. PATENT DOCUMENTS 5,309,345   5/1994   Nakamura et al. ...................... 363/41

*Primary Examiner*—Aditya Krishnan
*Attorney, Agent, or Firm*—McCormick, Paulding & Huber

[57] ABSTRACT

A boost-buck rectifier bridge circuit topology having two diode decoupled boost stages is formed as an H-shaped bridge with the alternating voltage source comprising the center leg and the first and second H-shaped bridge arms comprising a series connected SCR and bridge diode in each of the legs and a third and fourth bridge diode in the respective third and fourth arms of the H-shaped bridge. The first boost stage is coupled between the junction of the first SCR and first bridge diode and the negative polarity DC voltage bus and a second boost stage is coupled between the positive polarity DC voltage bus and the junction of the second SCR and second bridge diode in the second arm of the H-shaped bridge so that the first boost stage is decoupled by the first bridge diode and the second boost stage is decoupled by the second bridge diode whereby the load current delivered by the circuit is carried solely by the bridge diodes and not the boost stage switching devices.

7 Claims, 2 Drawing Sheets

BOOST-BUCK RECTIFIER BRIDGE CIRCUIT TOPOLOGY WITH DIODE DECOUPLED BOOST STAGE

The Government has rights in this invention pursuant to Contract No. N00024-92-C-4207 awarded by the United States Navy.

BACKGROUND OF THE INVENTION

The present invention relates generally to power conversion systems and deals more specifically with a boost-buck rectifier bridge circuit topology with diode decoupled boost stage.

Conventional boost-buck rectifier circuit topologies such as illustrated in FIG. 1 are generally well known and provide limited power to the load due to the current handling limitations of the switching device employed and as shown in dash line box 12, 14 and the switching device's antiparallel diode as shown in the dash line box 16, 18, respectively. The switching device 12, 14 is typically a high power switching transistor or power MOSFET. An Insulated Gate Bipolar Transistor (IGBT) offers a number of advantages over conventional switching devices and can be packaged with an integral antiparallel diode to form a single semiconductor module. The IGBT further is desirable rather than a power MOSFET in high voltage, hard switching applications because an IGBT has switching characteristics similar to a power MOSFET while maintaining its superior conduction ability. IGBT advantages over power MOSFET's and other power switching devices include lower conduction losses and smaller die area for the same output power. The smaller die area in IGBT's results in lower input capacitance, higher switching speeds and lower cost. Consequently it would be desirable to use IGBT's in boost-buck rectifier bridge circuit topologies if the current carrying limitations of the switching devices in the boost stage could be overcome.

In both the buck and boost modes, the main output load current must flow through the diodes 16, 18 during alternate half cycles of the generator voltage. Because the diodes are an integral part of the switching devices 16, 18, respectively, the diodes exhibit a high conduction loss due to the large forward voltage drop developed across the diode. Accordingly, the output power capable of being produced by the conventional boost-buck rectifier bridge circuit topology is severely limited by the thermal capability of the switching device antiparallel diode. Additional parallel diodes could in theory be used, however the additional diodes would have to be closely matched for proper current sharing. The use of matched diodes is not desirable and generally not feasible due to increased cost, increased component count, and complexity. Furthermore, in the event of a diode failure, the replacement of the failed diode must be with a matched diode. From a practical standpoint, both the failed diode and the remaining diode of the matched pair would have to be replaced with a known matched pair to ensure proper current sharing.

The above referenced and other power limitations associated with conventional boost-buck rectifier bridge circuit topologies due to the current handling limitations of the switching device and antiparallel diode is solved with the boost-buck rectifier bridge circuit topology of the present invention by decoupling the boost stage and the IGBT antiparallel diodes from the main current loop so that the load current does not flow through the antiparallel diodes.

A further advantage of the present invention is that the voltage generator can provide substantially more generator current than is possible in a conventional boost-buck rectifier bridge circuit topology so that the internal inductance of the voltage generator windings is sufficient to limit the generator current to a safe amplitude without an additional separate inductor which is required with conventional boost-buck rectifier bridge circuit designs.

A yet further advantage of the present invention is the provision of a high power boost-buck rectifier bridge circuit topology that has a lower component count than conventional boost-buck rectifier bridge circuit topologies.

SUMMARY OF THE INVENTION

A boost-buck circuit topology having a diode decoupled boost stage is presented in accordance with the present invention and comprises an H-shaped bridge wherein the center leg of the bridge comprises means defining a source of alternating voltage having an associated inductance, a positive polarity DC voltage bus, and a negative polarity DC voltage bus. Means defining a first arm of the H-shaped bridge comprises a series arrangement of a first SCR and a first bridge diode with the cathode of the diode connected to the positive DC bus and the anode of the SCR connected to one end of the center leg of the H-shaped bridge. Means defining a second arm of the H-shaped bridge includes a second SCR in series with a second bridge diode with the cathode of the second SCR connected to the first end of the center leg and the anode of the second diode connected to the negative polarity DC voltage bus. A third arm of the H-shaped bridge comprises a third bridge diode having its anode connected to the second end of the center leg and its cathode connected to the DC voltage bus. A fourth arm of the H-shaped bridge comprises a fourth bridge diode having its cathode connected to the second end of the center leg and its anode connected to the negative polarity DC voltage bus. A first boost stage switching device means is coupled between the junction of the series connected first SCR and first bridge diode and the negative polarity DC voltage bus. A second boost stage switching device is coupled between the junction of the series connected second SCR and second bridge diode and the positive polarity DC voltage bus. The first boost stage switching device means is decoupled from the positive polarity DC voltage bus by the first bridge diode and the second boost stage switching device means is decoupled from the negative polarity DC voltage bus by the second bridge diode so that load current is carried solely by the series connected first SCR and first bridge diode, second SCR and second bridge diode, third bridge and fourth bridge diode and the center leg of the H-shaped bridge. A load is connected between the positive and negative polarity DC voltage busses.

BRIEF DESCRIPTION OF THE DRAWINGS

Other features and advantages of the present invention will become readily apparent from the following written description and drawings wherein;

FIG. 3 is a set of waveforms for the boost-buck rectifier bridge circuit of the present invention for conventional buck mode operation wherein:

Figure 4:
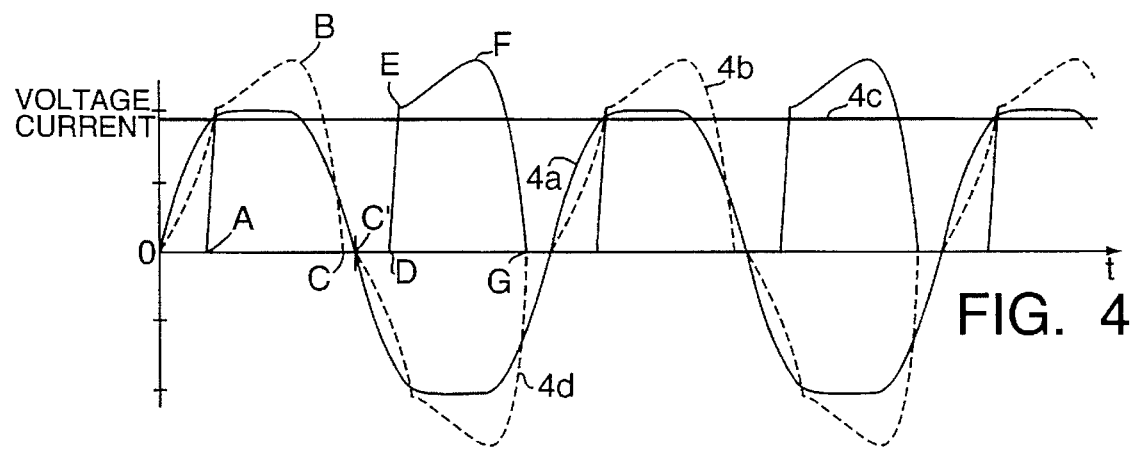
Figure 5:
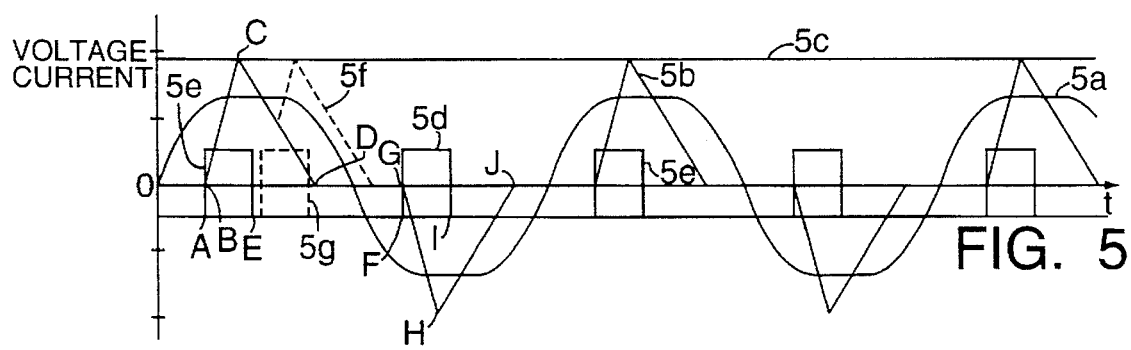

waveform 3a shows an exemplary voltage waveform produced by the voltage generator; waveform 3b shows an associated current waveform of the load current;

waveform 3c shows the DC bus voltage waveform;

FIG. 4 is a set of waveforms for the boost-buck rectifier bridge circuit of the present invention operating with the generator voltage above the DC voltage bus voltage wherein:

waveform 4a shows an exemplary voltage waveform produced by the voltage generator;

waveform 4b shows an associated current waveform of the load current;

waveform 4c shows the DC bus voltage waveform;

waveform 4d shows the generator current produced by the voltage generator;

FIG. 5 is a set of waveforms for the boost-buck rectifier bridge circuit of the present invention operating with the generator voltage below the DC voltage bus voltage wherein:

waveform 5a shows an exemplary voltage waveform produced by the voltage generator;

waveform 5b shows an associated current waveform of the load current;

waveform 5c shows the DC bus voltage waveform;

waveform 5d shows the gate pulse for the boost IGBT switching device connected to the positive DC voltage polarity bus;

waveform 5e shows the gate pulse for the boost IGBT switching device connected to the negative DC voltage polarity bus;

waveform 5f shows a second triangular shaped load current pulse delivered during the positive half cycle;

waveform 5g shows a second gate pulse for the boost IGBT switching device connected to the negative DC voltage polarity bus;

DESCRIPTION OF THE PREFERRED EMBODIMENTS

Figure 1:
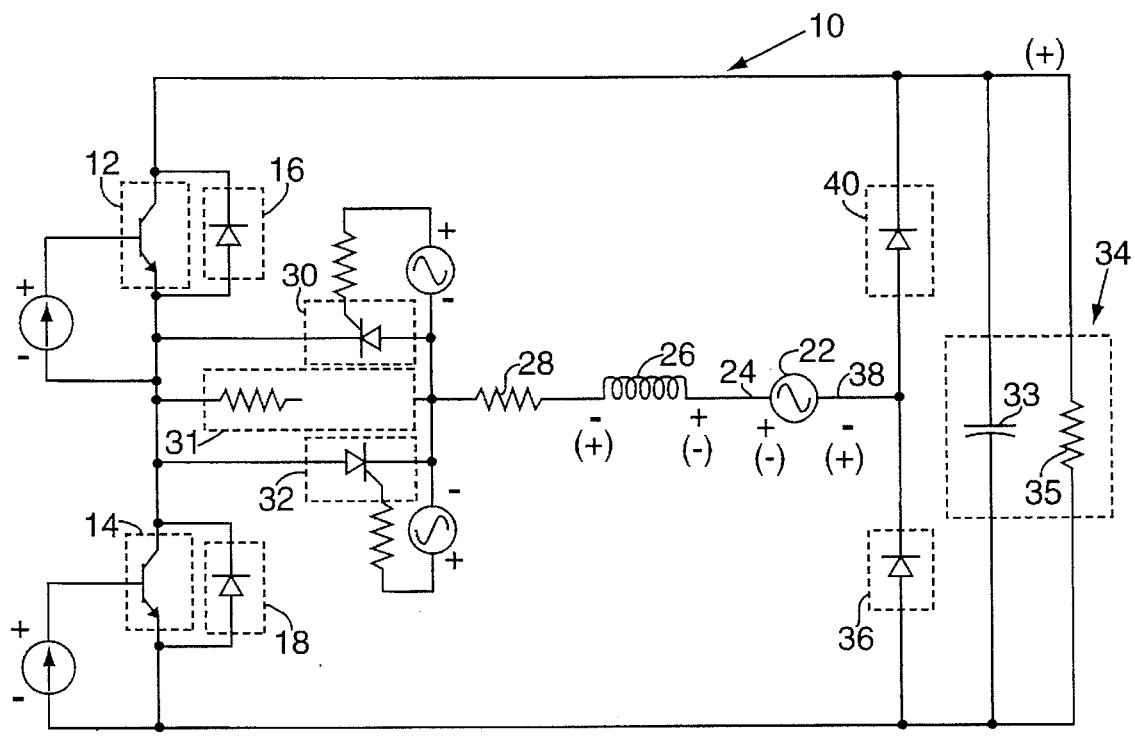
FIG. 1 is a simplified electrical schematic diagram of a conventional boost-buck rectifier bridge circuit topology of the prior art.

Turning now to the drawings, a conventional boost-buck rectifier bridge circuit schematic topology typical of the prior art and discussed somewhat above is illustrated in FIG. 1 and is generally designated 10. The circuit operation is well known to those skilled in the art and will only be discussed briefly here to provide a better understanding and appreciation of the present invention. The voltage generator 22 produces an alternating voltage and one end 24 is connected in series with an inductor 26, resistor 28 and a straight forward combination of an antiparallel connected pair of thyristors or silicon control rectifiers (SCR's) 30, 32 respectively in cascade in the center leg of an H-bridge configuration. During positive half cycles of the voltage generated by the voltage generator 22, current flows from one side 24 of the generator 22, through the inductor 26, through the SCR 30, through the switching device 14 which is conductive, through the bridge diode 36 to the opposite side 38 of the voltage generator 22. When the switching device 14 is shut-off or made non-conductive, the antiparallel diode 16 conducts the full load current which current flows from one side 24 of the generator 22, through the inductor 26, through the SCR 30, through the load resistor 35 shown in the dash line box 34 in parallel with capacitor 33, through the bridge diode 36 back to the opposite side 38 of the voltage generator 22. As the voltage magnitude produced by the voltage generator drops to zero, there is insufficient current to maintain conduction through the SCR 30 and as the voltage across the SCR changes polarity, the current switches or commutates to the SCR 32 which is now conductive so that current flows from the positive polarity side 38 of the voltage generator 22 through the bridge diode 40, through the switching device 12, through the SCR 32, through the inductor 26 and back to the negative polarity side 24 of the voltage generator 22. When either switching device 14 or 16 turns off, the current through the inductor 26 cannot change instantaneously from its maximum value. Therefore, the inductor discharges its current through either the SCR 30 and antiparallel diode 16 or SCR 32 and the antiparallel diode 18 to the DC bus and load resistor 35 in parallel with the capacitor 33. The load current flows until either the SCR 30 or SCR 32 become non-conductive and the current through the inductor changes direction. Reference may be made to trade literature and textbooks for additional information on the operation of the conventional boost-buck rectifier bridge circuit of the prior art illustrated in FIG. 1.

Figure 2:
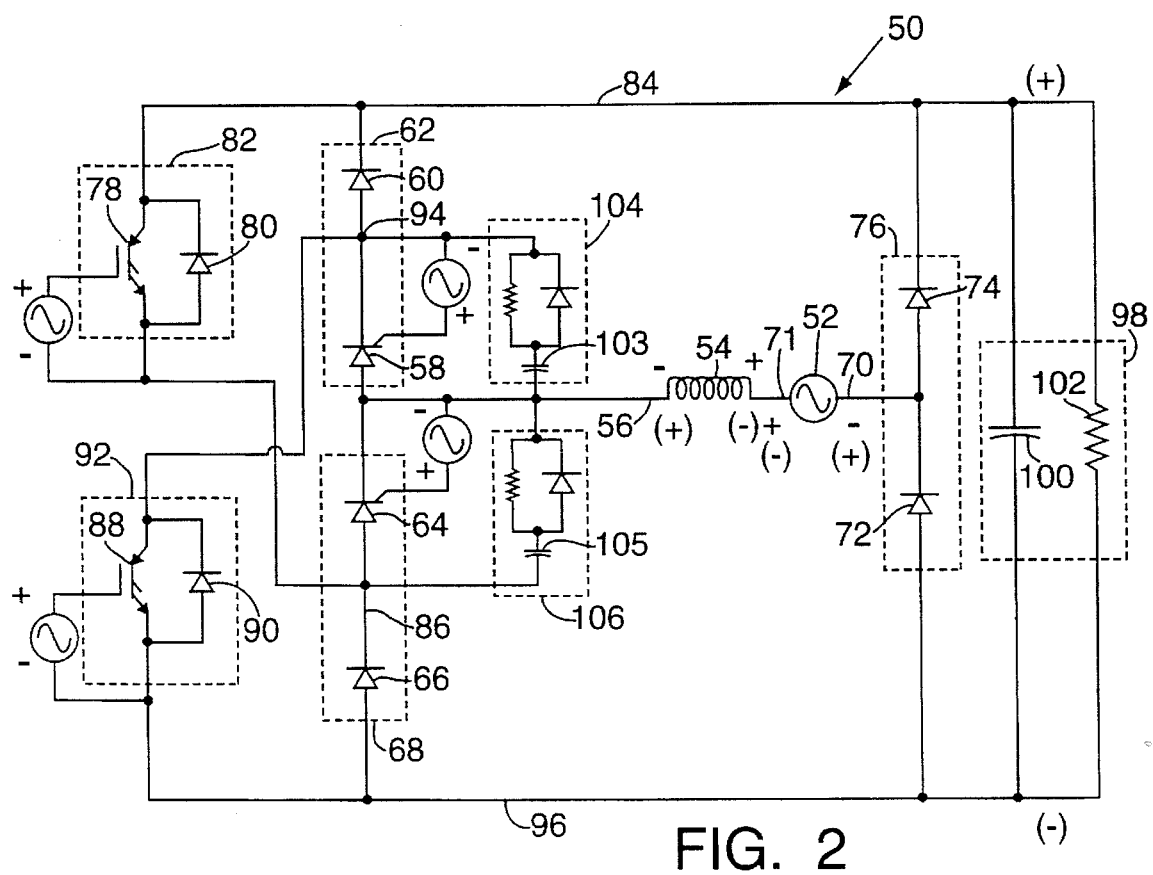
FIG. 2 is a somewhat simplified electrical circuit schematic diagram of a boost-buck rectifier bridge circuit topology with a diode decoupled boost stage embodying the present invention.

Turning now to FIG. 2 and considering the present invention in further detail, a somewhat simplified electrical schematic diagram of a boost-buck rectifier bridge circuit topology with a diode decoupled boost stage is illustrated therein and generally designated 50. The operation of the boost-buck rectifier bridge circuit of the present invention is explained in further detail below in conjunction with three distinct operating modes.

The boost-buck circuit illustrated in FIG. 2 is similar in appearance to the boost-buck circuit of the prior art in that a H-shaped diode bridge is utilized and includes the voltage generator 52 and internal leakage inductance 54 of the windings of the voltage generator in the center leg of the H-shaped diode bridge. One end 56 of the inductor 54 is connected to the junction of the series combination of SCR 58 and bridge diode 60 as shown in the dash line box 62 and the SCR 64 and series bridge diode 66 as shown in the dash line box 68. The series combination of the bridge diode and SCR is commercially available under the tradename "PWR-BRICK" from Powerex. The end 70 of the generator 52 in the center leg of the H-shaped bridge is connected to the junction of the bridge diodes 72, 74 as shown in the dash line box 76. IGBT switching device 78 and its antiparallel diode 80 as illustrated in the dash line box 82 is connected between the DC positive polarity voltage bus 84 and the junction 86 of the series combination of SCR 64 and diode 66. IGBT 88 and its antiparallel diode 90 as illustrated in the dash line box 92 is connected between the junction 94 of the series combination of SCR 58 and bridge diode 60 and the negative polarity DC voltage bus 96. The load shown in the dash line box 98 and represented by the capacitive element 100 and the resistive element 102 is connected between the positive DC polarity voltage bus 84 and negative DC polarity voltage bus 96. Respective snubber circuits illustrated and shown within a dash line box 104, 106 are connected across the SCR 58 and SCR 64 respectively. The gate control of the SCR 58, SCR 64 and the IGBT 78 and IGBT 88 are shown schematically and phased to coincide with the phase of the voltage generator 52. In actuality, the control circuitry is a sophisticated and complex control taking into account load variations, input voltage magnitude fluctuations and variation, load demand and so forth. For purposes of explanation of the present invention, it is not necessary to have a detailed explanation of the control circuitry actually employed and it is sufficient to know that the SCR's and IGBT's are gated on and turn-off at the indicated times as will become apparent from the waveforms below.

Although the circuit topologies are similar, the following are the fundamental differences between the boost-buck configuration of the prior art and that of the present invention. The main bridge current is bypassed through the bridge diodes 60, 66 rather than the IGBT antiparallel diodes 80, 90 as would be the case in the prior art therefore allowing the bridge diodes 60, 66 to be of a much higher current handling rating than the integral IGBT antiparallel diodes 80, 90. The conduction losses of the IGBT antiparallel diodes 80, 90 are therefore reduced to negligible levels while still performing their vital protective function to protect the IGBT's against reverse voltage transients.

The snubber circuit losses are very much smaller for a given forward DV/DT across the SCR's 58, 64 due to the fact that the reverse recovery current charging the snubber circuit capacitors 103, 105 respectively of the snubbers 104, 106 is controlled by the reverse recovery charge of the bridge diode 60 and bridge diode 66 in series with the SCR 58 and SCR 64 respectively rather than by the reverse recovery charge of the SCR 58 and SCR 64. The reverse recovery charge of the SCR's is approximately twice as large for the same current rating as the diode recovery charge of the bridge diodes 60, 66. Therefore, the dissipated energy in the snubber circuits 104, 106 is substantially less than the dissipated energy in the snubber circuit 31 of the prior art boost-buck circuit.

Additionally, the total number of semiconductor modules is reduced from eight in the conventional boost-buck circuit of FIG. 1 to five semiconductor modules in the boost-buck circuit of the present invention shown in FIG. 2.

Furthermore, the range of voltage produced by the voltage generator is significantly increased in the boost-buck circuit of the present invention because the losses of the IGBT antiparallel diodes do not limit the current handling capabilities of the bridge circuit and in actuality, the power capability of the present invention is triple that of conventional prior art boost-buck circuits.

Figure 3:
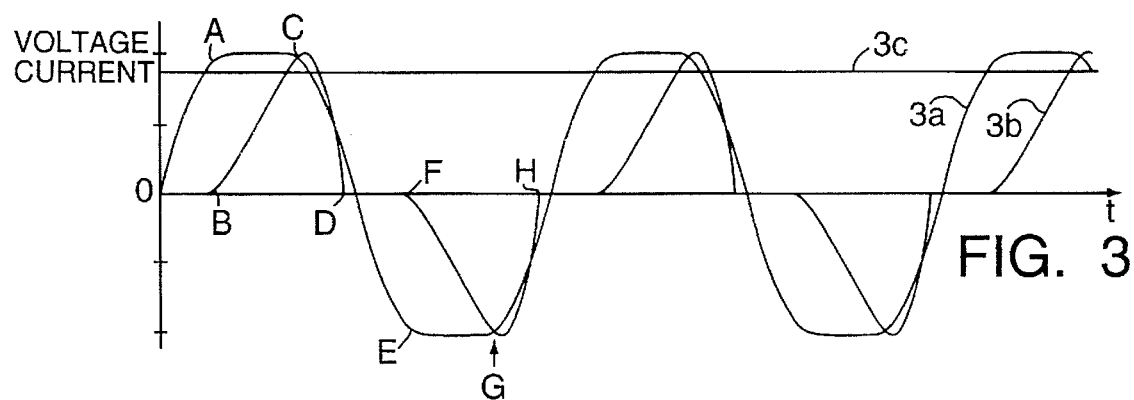

In the buck mode operation, the magnitude of the DC voltage cannot be higher than the peak voltage produced by the voltage generator 52. Referring to FIG. 3 and waveforms 3a–3c for a typical circuit operation, waveform 3a shows the generator voltage as a semitrapezoidal voltage waveform. The current flowing in the bridge is illustrated in waveform 3b and the DC bus voltage applied to the load is illustrated in waveform 3c. In the present example, the magnitude of the voltage produced by the voltage generator increases to a level designated A at which time the SCR 58 is gated on into conduction so that current starts to flow at the point indicated B on waveform 3b and rises until the voltage of the voltage generator starts to decrease as illustrated at point C on waveform 3a. The current flows from the end 71 of the voltage generator 52 through the inductor 54, through the conductive SCR 58, through the series bridge diode 60 to the DC positive polarity voltage bus 84, through the load 98, through the bridge diode 72 back to the negative polarity end 70 of the voltage generator 52 to complete the loop. As the voltage produced by the generator drops, there is a decreasing current supplied to the load until such time as the forward current of the SCR 58 is reduced to zero as represented by point D in waveform 3b. As the voltage produced by the voltage generator 52 enters the negative half cycle, there is no additional load current delivered until the voltage reaches point E as shown in waveform 3a. Also at this point, the SCR 64 is gated to become conductive and which corresponds to point F in waveform 3b. Current then flows from the end 70 which is now the positive polarity, through the bridge diode 74, through the load resistor 102 in parallel with the capacitor 100 shown in the dash line box 98, through the bridge diode 66, through the conductive SCR 64, to the negative polarity side 71 of the voltage generator 52 thus maintaining the proper voltage polarity across the load 98. The load current delivered continues to increase until point G is reached on the voltage waveform and while the voltage is decreasing to zero, the load current delivered likewise is decreasing until there is insufficient forward current through the SCR 64 to maintain conduction. This point is illustrated as H in waveform 3b. Once the generator voltage crosses zero and starts the positive half cycle, the sequence is repeated. It should be readily obvious that the DC voltage magnitude is controlled by the conduction time of the SCR's and that the DC voltage cannot rise higher than the peak voltage produced by the voltage generator. It should be noted that the load current does not flow through the antiparallel diodes 80, 90 in the buck mode. This is in contrast to the conventional boost-buck circuit of FIG. 1 wherein the antiparallel diodes 16, 18 function as the bridge diodes and carry the entire load current as explained above.

Considering now FIG. 4, and the operation of the boost-buck rectifier bridge circuit topology of the present invention in the boost mode wherein the generator voltage has a higher peak voltage than the DC bus voltage, waveform 4a illustrates semitrapezoidal voltage waveform generated by the voltage generator and is similar to the voltage waveform illustrated in waveform 3a. The DC bus voltage is illustrated in waveform 4c and the load current delivered is illustrated in waveform 4b and is shown as a rectified current. Waveform 4d illustrates the generator current produced by the voltage generator 52. The current supplied to the load is controlled by the circuit as follows. For purpose of explanation, both the IGBT 88 and SCR 58 are gated conductive at time zero, and the load current delivered remains at zero until point A is reached at which time the IGBT 88 is gated off and SCR 58 is still on so that the full current developed by the voltage generator 52 is conducted through the SCR 58 and bridge diode 60 to the voltage bus 84 through the load 98 and back through the bridge diode 72 to the voltage generator. As shown, the load current supplied to the DC voltage bus increases until such time as the generator voltage magnitude drops below the DC voltage bus magnitude which is illustrated at point B in waveform 4b. The load current is still supplied to the DC bus as the generator voltage drops to zero. The load current will continue to flow through the SCR 58 until such time as the forward current is insufficient to maintain conduction and this is illustrated at point C in waveform 4b with the generator voltage crossing zero slightly later than the time that the SCR 58 commutates off. At point C', both the IGBT 78 and the SCR 64 are gated on as the generator voltage enters the negative half cycle. At point D in waveform 4b the IGBT 78 is gated off which causes the load current to rise rapidly until it reaches a magnitude indicated at point E. The load current then continues to increase with the current flowing from the negative side 71 of the voltage generator 52 through the inductance 54, through the SCR 64, through bridge diode 66 to the negative polarity DC voltage bus 96, through the load 98 and back to the positive polarity side 70 of the voltage generator 52 through the bridge diode 74. The current increases until such time as the generator voltage starts to become more positive as it approaches zero and this is indicated at point F on the current waveform shown in waveform 4b. The load current delivered likewise begins to drop to zero as the generator voltage magnitude approaches zero until such time as the SCR 64 becomes non-conductive and the load current becomes zero as shown at point G in waveform 4b. The cycle is then repeated as the voltage generator starts its positive half cycle.

Turning now to FIG. 5, the operation of the boost-buck circuit of the present invention is shown in waveforms 5a–5e wherein the peak voltage of the voltage generator is lower than the magnitude of the DC output voltage. Waveform 5a illustrates the voltage waveform produced by the voltage generator wherein the peak value is less than the DC bus voltage magnitude as illustrated in waveform 5c. In this situation, it is necessary to provide more load current to the bus to maintain the DC voltage magnitude at the desired level. In some instances, it may be necessary to add multiple boost pulses during each half cycle to obtain the desired current level. As illustrated in waveforms 5a–5e, only one boost pulse is provided for each half cycle of the voltage generator. As illustrated in waveform 5e, the IGBT 88 is gated on at point A and off at point E. The voltage produced by the voltage generator 52 increases in value although substantially less than the DC bus voltage. Corresponding to the point A at which the IGBT 88 is turned on, the SCR 58 is also gated on and this corresponds to point B of the current waveform of waveform 5b. The generator current starts to increase but it is not delivered to the load. As the current reaches the maximum at point C, the IGBT 88 is switched off or made non-conductive, and any decaying current is delivered to the load as illustrated by the waveform 5b. The current path is from the positive end 71 of the voltage generator 52, through the inductor 54, through the SCR 58, bridge diode 60 and to the DC voltage bus 84, through the load 98 returning to the negative polarity side 70 of the voltage generator 52 via the bridge diode 72. The generator voltage crosses zero and continues into the negative half cycle. The IGBT 78 is gated on at point F as shown in waveform 5d and the SCR 64 is gated on at point G as illustrated in waveform 5b so that current begins to flow but is not delivered to the load. The generator current increases until point H is reached. At point H, the IGBT 78 is switched off. Now the generator current, although decreasing, begins to flow to the load while the generator voltage becomes more positive approaching zero. The IGBT 78 is gated off at point I as illustrated in waveform 5d. SCR 64 becomes non-conductive as the forward current is not able to sustain conduction and this is illustrated at point J in waveform 5b.

If additional load current is required, multiple boost pulses may occur during each alternate half cycle so that the delivered load current rather than decaying to zero is reinforced with an additional amount of current. The additional load current is shown in FIG. 5 as a second triangular peak during the positive half cycle and is illustrated by the dashed line triangular waveform 5f. The corresponding additional boost pulse is illustrated by the dashed line pulse in waveform 5g.

A buck-boost rectifier bridge circuit topology with a diode decoupled boost stage has been described above in an exemplary embodiment for a single phase. A multiple phase system can be arranged by phase shifting the voltage produced by the respective voltage generators. Therefore, the present invention has been described by way of example rather than limitation.

The invention claimed:

1. A boost-buck circuit, comprising:

means defining a source of alternating voltage and having an intrinsic inductance and forming a center leg of an H-shaped bridge;

means defining a positive polarity DC voltage bus;

means defining a negative polarity DC voltage bus;

means defining a first arm of said H-shaped bridge and comprising a first SCR having its anode connected to a first end of said center leg, a first bridge diode in series with said first SCR and having its anode connected to the cathode of said first SCR and having its cathode connected to said positive polarity DC voltage bus;

means defining a second arm of said H-shaped bridge and comprising a second SCR having its cathode connected to said first end of said center leg, a second bridge diode in series with said second SCR and having its cathode connected to the anode of said second SCR and having its anode connected to said negative polarity DC voltage bus;

means defining a third arm of said H-shaped bridge and comprising a third bridge diode having its anode connected to a second end of said center leg and having its cathode connected to said positive polarity DC voltage bus;

means defining a fourth arm of said H-shaped bridge and comprising a fourth bridge diode having its cathode connected to said second end of said center leg and having its anode connected to said negative polarity DC voltage bus;

a first boost stage switching device means coupled between the junction of said series connected first SCR and first bridge diode and said negative polarity DC voltage bus for generating boost current pulses during positive half cycles of said alternating voltage source means;

a second boost stage switching device means coupled between the junction of said series connected second SCR and said second bridge diode and said positive polarity DC voltage bus for generating boost current pulses during negative half cycles of said alternating voltage source means;

whereby said first boost stage switching device means is decoupled from said positive polarity DC voltage bus by said first bridge diode and said second boost stage switching device means is decoupled from said negative polarity DC voltage bus by said second bridge diode.

2. A boost-buck circuit as defined in claim 1 wherein said first boost stage switching device means comprises a first insulated gate bipolar transistor (IGBT) and first integral antiparallel diode, and said second boost stage switching device means comprises a second insulated gate bipolar transistor (IGBT) and second integral antiparallel diode.

3. A boost-buck circuit as defined in claim 2 wherein said first IGBT and said first SCR are gated conductive for a predetermined time during a negative half cycle of said alternating voltage source means.

4. A boost-buck circuit as defined in claim 3 wherein said second IGBT and said second SCR are gated conductive for a predetermined time during a positive half cycle of said alternating voltage source means.

5. A boost-buck circuit as defined in claim 2 wherein said first IGBT and said first SCR are gated conductive N number of times for predetermined time intervals during a negative half cycle of said alternating voltage source means.

6. A boost-buck circuit as defined in claim 3 wherein said second IGBT and said second SCR are gated conductive N number of times for predetermined time intervals during a positive half cycle of said alternating voltage source means.

7. A boost-buck circuit as defined in claim 1 wherein said means defining said alternating voltage source comprises a voltage generator and said intrinsic inductance is the leakage inductance of windings of said voltage generator.

* * * * *

UNITED STATES PATENT AND TRADEMARK OFFICE
CERTIFICATE OF CORRECTION

PATENT NO.   :   5,625,549
DATED        :   April 29, 1997
INVENTOR(S)  :   Ivan Horvat It is certified that error appears in the above-indentified patent and that said Letters Patent is hereby corrected as shown below:

<u>Cover Page</u>

Item [73] Assignees: line 1, please delete "Electronics"

and substitute --Electromagnetics--.

Signed and Sealed this

Third Day of February, 1998

BRUCE LEHMAN

*Attest:*

*Attesting Officer*   *Commissioner of Patents and Trademarks*